T. SLOPER.
AEROPLANE WHEEL BEARING.
APPLICATION FILED JULY 25, 1917.
1,313,646.
Patented Aug. 19, 1919.
2 SHEETS—SHEET 2.
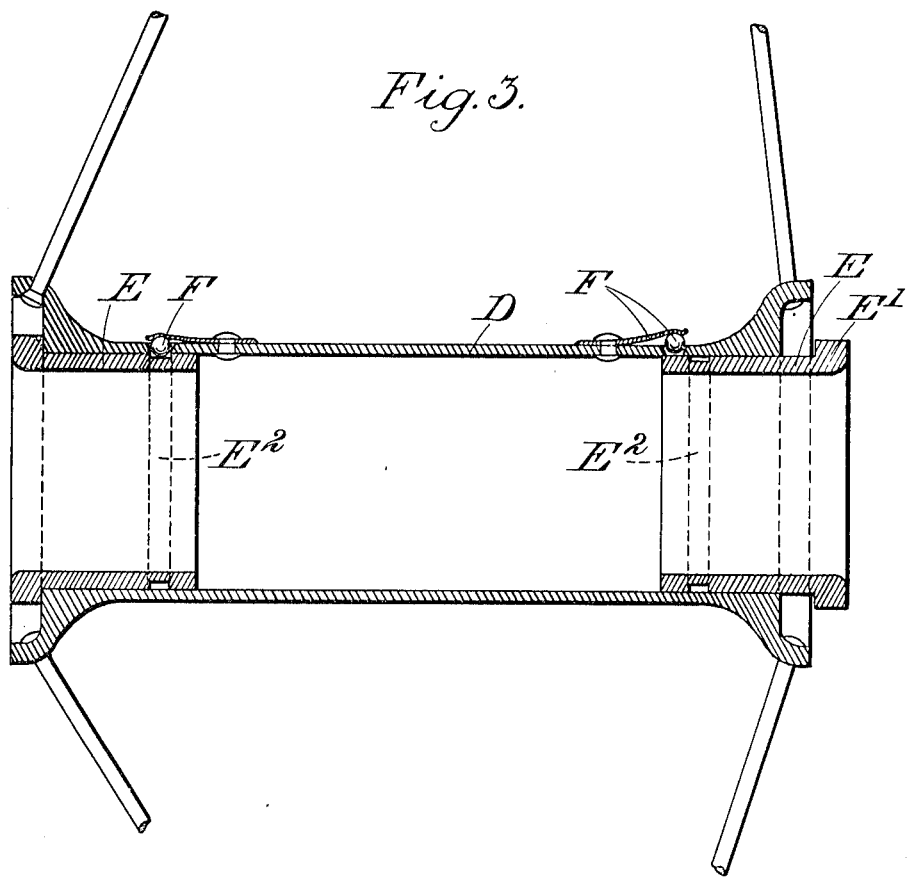
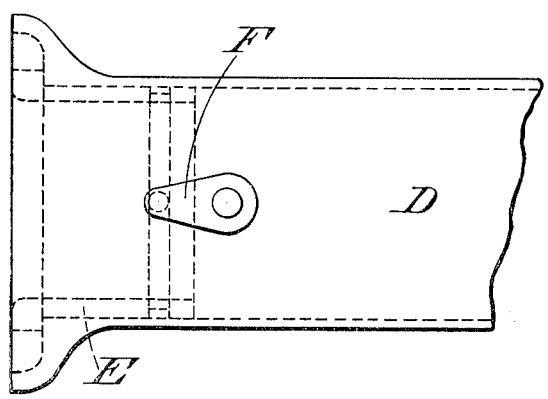
Witnesses
R. A. Balderson
Inventor
Thomas Sloper

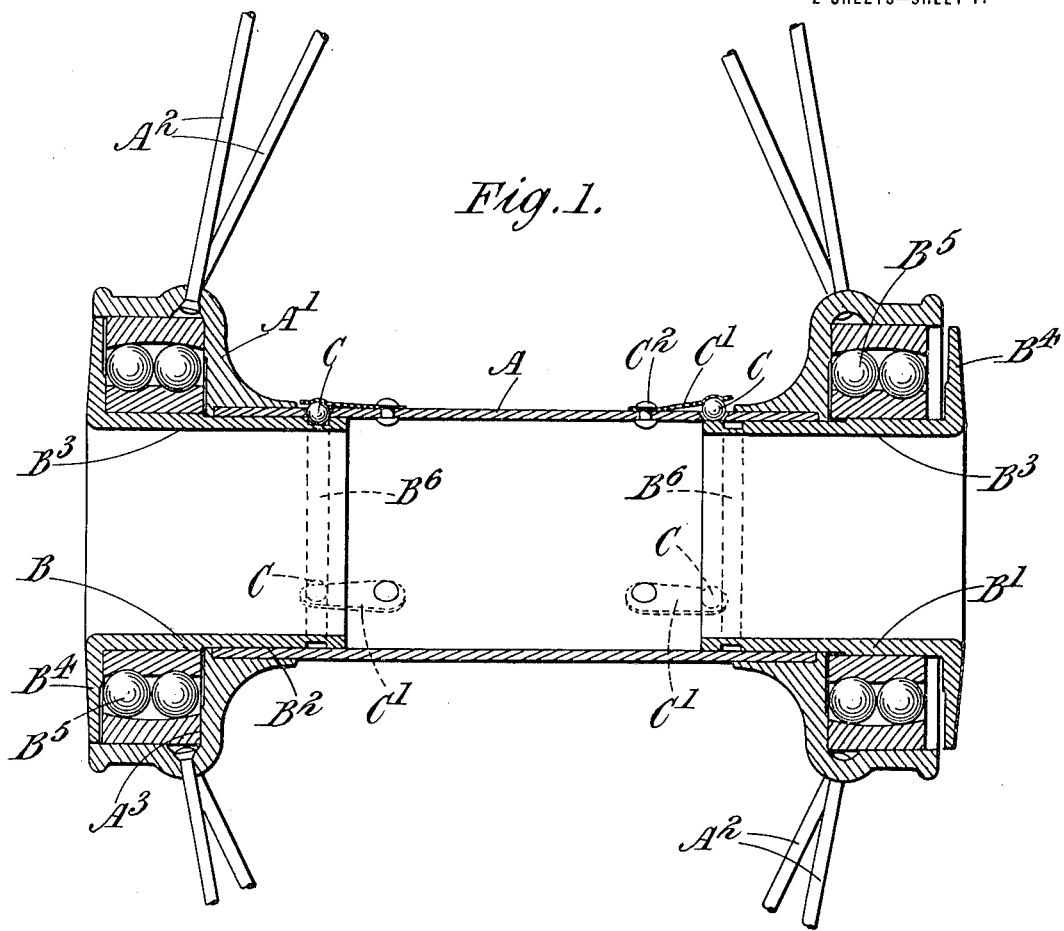
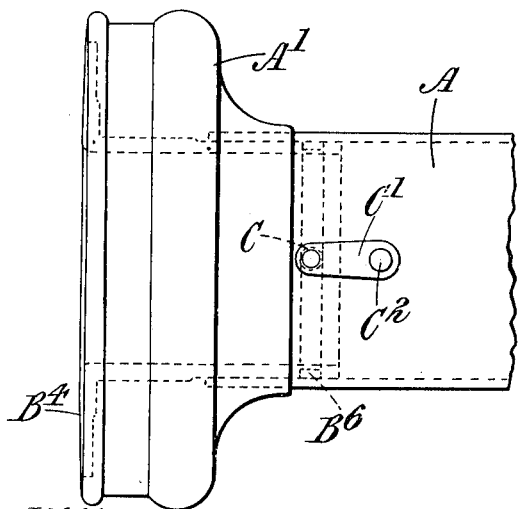

UNITED STATES PATENT OFFICE.

THOMAS SLOPER, OF DEVIZES, ENGLAND.

AEROPLANE-WHEEL BEARING.

1,313,646.    Specification of Letters Patent.    Patented Aug. 19, 1919.

Application filed July 25, 1917. Serial No. 182,648.

*To all whom it may concern:*

Be it known that I, THOMAS SLOPER, a subject of the King of England, residing in Devizes, Wiltshire, England, have invented certain new and useful Improvements in Aeroplane-Wheel Bearings, of which the following is a specification.

This invention is for improvements in or relating to the bearings of wheels for aeroplanes or aircraft generally.

It will be appreciated that the wheels of aircraft are put to sudden strains of considerable intensity and the seizure of one of the wheels on its axle at such a time might have serious results.

The object of the present invention is to provide against such seizure by the use of loose bearing-bushes and to insure that such bushes shall not be lost by falling from the wheel, as for instance when substituting one wheel for another or otherwise handling the wheels when removed from their supporting axles.

According to this invention, there is combined with an aircraft wheel-hub, loose bearing-bushes having exterior and interior bearing surfaces, and means for retaining them against endwise displacement from the hub when the axle is not in place, which means can be easily released and do not interfere with the rotation of the bushes in the hub.

Preferably the retaining-means employed is such as to enable the bushes to be removed without the use of a tool, for example it may take the form of a spring-controlled detent which can be forced out from engagement with the bush by forcibly pulling the bush endwise out from the hub.

In the accompanying drawings:—

Figure 1 is a central vertical section through a hub and bushes with their retaining-means constructed according to one method of carrying out this invention;

Fig. 2 is a plan of one end of the hub shown in Fig. 1 with the retaining-means for one bush in place;

Fig. 3 is a central vertical section through a hub and bushes with their retaining-means constructed according to another method of carrying out this invention, and Fig. 4 is a plan of one end of the hub shown in Fig. 3 with the retaining-means for one bush in place.

The same letters indicate the same parts throughout the drawings.

The hub A may be in the form of a plain barrel having flanged ends $A^1$ to receive spokes $A^2$ for connection to the wheel-rim. In the ends of the hub, bushes B, $B^1$ (one in each end) are inserted. These bushes are finished to provide an exterior bearing-surface $B^2$ for the hub and an interior bearing-surface $B^3$ for the axle.

The end of each bush has a flange $B^4$ and the hub ends $A^1$ are hollowed at $A^3$ to receive this flange and a ball-bearing $B^5$ mounted on the bush immediately behind the flange; the exterior end of each bush lies flush with the hub ends when the bushes are thrust home. The inner race-member of each ball-bearing is made a tight fit on the bush, so that when the bush is removed the ball-bearing comes away with it, the outer race-member being less tightly fitted in the hub.

Each bush has near its inner end a circumferential channel $B^6$, and mounted in holes in the hub, alined to each of these channels, are balls C. The holes, which may be three in number for each bush, are conical, the larger opening being on the exterior side of the hub and the dimensions are such that the balls can project through the holes into the channel, as shown, but cannot pass through the hole when the bush B is removed. To hold each ball in place, a controlling spring $C^1$ is riveted at $C^2$ to the hub, which spring always presses the ball toward the interior of the hub.

The axle upon which the wheel would be mounted is not shown in the drawings as this is not necessary for an explanation of the invention, but the bushes B are free to run on the axle. Normally the wheel will run on the ball-bearings $B^5$ as these with the exterior bearing-surface $B^2$ will usually offer less resistance to the movement of the hub than will the inner bearing-face $B^3$ against the axle. If, however, either bush seizes in the hub, or one of the ball-bearings becomes so damaged as to resist rotation, the bush will then freely rotate on the axle, and thus locking of the wheel at what may be a critical moment will be prevented. The retaining balls C in no way prevent free rotation of the wheel-hub relatively to the bushes as they travel around in the channels $B^6$ formed in the latter.

With loose bushes, however, the tendency is for one or other of the bushes to become displaced when the wheel is off the axle, as for example when substituting one wheel for another, say for the purpose of tire or other repairs, or when a spare wheel is brought out of stock the bushes are likely to be found missing. Any such loss of the bushes is prevented by the spring-controlled ball-detents C which engage the circumferential grooves B⁵ and hold the bushes securely against displacement by any ordinary handling, though each bush can be removed endwise by applying sufficient endthrust from within the hub. The construction described thus insures against seizure of any one of the wheels at a critical moment which might have serious results and also insures against loss of the loose bushes when the wheels are not on their axles.

The removability of the bushes in addition to allowing of ready dismantling for repair purposes, permits the bushes to be easily changed for others having a different bore.

In Figs. 3 and 4, the hub D is provided with plain bushes E, the ball-bearing B⁵ of Figs. 1 and 2 being dispensed with. The bushes E are finished with a bearing-surface on the inside and on the outside so that the hub can either run on the exterior of the bushes or the bushes can run on the axle rotating with the hub according to the varying degrees of friction found between the axle and bushes or between the bushes and hub.

Each bush is provided with a flange E¹ which limits the amount of endwise movement allowed it inward in the hub and when the flanges are home against the hub, the ball-detents F engage the circumferential channels E². The bush on the right of Fig. 3 is shown partly removed.

What I claim as my invention and desire to secure by Letters Patent is:—

1. For aircraft-wheels the combination of a wheel-hub, loose bearing-bushes one in each end having exterior and interior bearing-surfaces, and spring-controlled detents on the hub one for each bush, each detent engaging an annular groove in the exterior face of its bush to retain it against endwise movement, for the purpose set forth.

2. For aircraft-wheels the combination of a wheel-hub, loose bearing-bushes one in each end having exterior and interior bearing-surfaces, ball-detents at each end of the hub which balls project partly through the interior wall of the hub each into an annular groove in the outer face of the bush to which the ball is allotted, and springs one for each ball to keep them forward toward the bushes, the holes for the balls being too small to allow their passage through the hub, for the purpose set forth.

3. For aircraft-wheels the combination of a wheel-hub, loose bearing-bushes one in each end having exterior and interior bearing-surfaces and a flange at the outer end to limit their axial movement inward in the hub, and spring-controlled detents on the hub one for each bush, each detent engaging an annular groove in the exterior face of its bush to retain it against endwise movement, for the purpose set forth.

4. For aircraft-wheels the combination of a wheel-hub, loose bearing-bushes one in each end having exterior and interior bearing-surfaces and an outwardly-directed flange at the outer end to limit their axial movement inward in the hub, ball-bearings one on the outer end of each bush immediately behind the aforesaid flange which bearing is accommodated in a recess in the end of the hub, and spring-controlled detents on the hub for each bush each detent engaging an annular groove in the exterior face of its bush to retain it against endwise movement, for the purpose set forth.

In testimony whereof I have signed my name to this specification.

THOMAS SLOPER.